US012725822B2

(12) United States Patent
Jang et al.

(10) Patent No.: US 12,725,822 B2
(45) Date of Patent: Sep. 1, 2026

(54) METHOD OF MANUFACTURING HIGHLY DURABLE ELECTROLYTE MEMBRANE FOR FUEL CELLS

(71) Applicants: Hyundai Motor Company, Seoul (KR); Kia Corporation, Seoul (KR)

(72) Inventors: Se Wook Jang, Suwon-si (KR); Kweon Ju Park, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 587 days.

(21) Appl. No.: 18/331,408

(22) Filed: Jun. 8, 2023

(65) Prior Publication Data

US 2024/0136559 A1 Apr. 25, 2024
US 2024/0234777 A9 Jul. 11, 2024

(30) Foreign Application Priority Data

Oct. 21, 2022 (KR) ........................ 10-2022-0136347

(51) Int. Cl.

*H01M 8/1086* (2016.01)
*H01M 8/10* (2016.01)
*H01M 8/1039* (2016.01)
*H01M 8/1053* (2016.01)

(52) U.S. Cl.

CPC ....... *H01M 8/1093* (2013.01); *H01M 8/1039* (2013.01); *H01M 8/1053* (2013.01); *H01M 2008/1095* (2013.01)

(58) Field of Classification Search

CPC ............. H01M 8/1093; H01M 8/1039; H01M 8/1053; H01M 2008/1095

See application file for complete search history.

(56) References Cited

U.S. PATENT DOCUMENTS

2009/0068537 A1* 3/2009 Kawakami .......... H01M 8/1023 429/494
2021/0075032 A1* 3/2021 Kim .................... H01M 8/0258

FOREIGN PATENT DOCUMENTS

KR 20070111146 A 11/2007
KR 20200122038 A * 10/2020 .......... H01M 8/1081

OTHER PUBLICATIONS

EPO machine generated English translation of KR-20200122038-A (Year: 2020).*
Choi et al. (Nanofiber composite membranes with low equivalent weight perfluorosulfonic acid polymers). DOI: 10.1039/c0jm00441c (Year: 2020).*
PMA (Common Urethane Calculations) (Year: 2001).*

* cited by examiner

*Primary Examiner* — Kimberly Wyluda

(74) *Attorney, Agent, or Firm* — Slater Matsil, LLP

(57) ABSTRACT

An embodiment method of manufacturing an electrolyte membrane for fuel cells includes preparing a three-layer structure including a first ionomer layer on a first surface of a porous support and a second ionomer layer on a second surface of the porous support opposite the first surface, pressurizing an inert gas into the three-layer structure to produce a microporous membrane, impregnating the microporous membrane with an additional ionomer solution, and drying the microporous membrane.

16 Claims, 5 Drawing Sheets

METHOD OF MANUFACTURING HIGHLY DURABLE ELECTROLYTE MEMBRANE FOR FUEL CELLS

CROSS-REFERENCE TO RELATED APPLICATIONS

This application claims the benefit of Korean Patent Application No. 10-2022-03136347, filed on Oct. 21, 2022, which application is hereby incorporated herein by reference.

TECHNICAL FIELD

The present disclosure relates to a method of manufacturing a highly durable electrolyte membrane for fuel cells.

BACKGROUND

Electrolyte membranes function to conduct protons in polymer electrolyte membrane fuel cells (PEMFCs). Electrolyte membranes were produced using an ionomer to transfer protons. The ionomer is impregnated with water to selectively transfer protons generated at the anode to the cathode.

Since the electrolyte membrane includes an ionomer, it greatly shrinks and expands due to the moisture content thereof. To compensate for this, an electrolyte membrane is produced by impregnating a porous support with the ionomer. When all of the ionomer is impregnated in the pores of the porous support, a channel through which protons move may be formed.

As the electrolyte membrane used in the prior art, a reinforced electrolyte membrane has a three-layer structure of ionomer/reinforced layer/ionomer formed by applying an ionomer to both surfaces of a porous material called "ePTFE" in order to secure mechanical strength.

However, in the three-layered electrolyte membrane, the fraction of ionomer is lowered, the proton conductivity is reduced, and thus the performance of the electrolyte membrane is reduced.

Therefore, there is a need to develop a method for manufacturing an electrolyte membrane having high ionic conductivity and high rigidity.

SUMMARY

Embodiments of the present invention can solve problems associated with the prior art.

One embodiment of the present invention provides a method of manufacturing an electrolyte membrane for fuel cells to improve durability.

The embodiments of the present invention are not limited to that described above. The embodiments of the present invention will be clearly understood from the following description and are capable of being implemented by means defined in the claims and combinations thereof.

One embodiment of the present invention provides a method of manufacturing a highly durable electrolyte membrane for fuel cells including preparing a three-layer structure including a first ionomer layer-porous support-second ionomer layer structure, pressurizing an inert gas into the three-layer structure to produce a microporous membrane, impregnating the microporous membrane with an additional ionomer solution, and drying the microporous membrane.

The preparing the three-layer structure may include preparing a substrate, applying a first ionomer solution to the substrate, impregnating one surface of the porous support with the first ionomer solution, and applying a second ionomer solution to the other surface of the porous support to form the three-layer structure having the structure including the first ionomer layer, the porous support, and the second ionomer layer.

The first ionomer solution may include at least one selected from the group consisting of sulfonated polyimide (S-PI), sulfonated polyarylethersulfone (S-PAES), sulfonated polyetheretherketone (S-PEEK), perfluorosulfonic acid (PFSA), sulfonated polybenzimidazole (S-PBI), sulfonated polysulfone (S-PSU), sulfonated polystyrene (S-PS), sulfonated polyphosphazene, and combinations thereof.

The second ionomer solution may include at least one selected from the group consisting of sulfonated polyimide (S-PI), sulfonated polyarylethersulfone (S-PAES), sulfonated polyetheretherketone (S-PEEK), perfluorosulfonic acid (PFSA), sulfonated polybenzimidazole (S-PBI), sulfonated polysulfone (S-PSU), sulfonated polystyrene (S-PS), sulfonated polyphosphazene, and combinations thereof.

The porous support may be an expanded polytetrafluoroethylene (e-PTFE) support.

The producing the microporous membrane may be performed by applying a pressure of 50 to 200 kPa to the three-layer structure in a vertical direction of the three-layer structure for 1 to 10 minutes.

The producing the microporous membrane may be performed at a temperature of 10 to 40° C.

The producing the microporous membrane may be performed using an inert gas pressurization device, wherein the inert gas pressurization device includes a lower chamber configured to dispose the three-layer structure in a horizontal direction and an upper chamber configured to fix the three-layer structure and pressurize the inert gas.

The inert gas may include at least one selected from the group consisting of nitrogen, argon, helium, and combinations thereof.

The impregnating the microporous membrane may be performed by impregnating the microporous membrane with the additional ionomer solution within 1 minute after the micropore formation.

The additional ionomer solution may include distilled water, a fluorine-based polymer, ethanol, and normal propanol (n-propanol, nPA).

The fluorine-based polymer may have an equivalent weight (EW) of 800 or more.

The additional ionomer solution may have a viscosity of 60 to 80 cP.

The drying the microporous membrane may be performed at a temperature of 80 to 180° C. for 5 to 30 minutes.

Another embodiment of the present invention provides a highly durable electrolyte membrane for fuel cells manufactured using the method according to embodiments of the present invention, wherein the electrolyte membrane has a configuration in which micropores are formed in a three-layer structure including a first ionomer layer, a porous support, and a second ionomer layer.

Other aspects of preferred embodiments of the invention are discussed infra.

BRIEF DESCRIPTION OF THE DRAWINGS

The above and other features of embodiments of the present invention will now be described in detail with reference to certain exemplary embodiments thereof illustrated in the accompanying drawings which are given hereinbelow by way of illustration only, and thus are not limitative of the present invention, and wherein.

DETAILED DESCRIPTION OF ILLUSTRATIVE EMBODIMENTS

Figure 1:
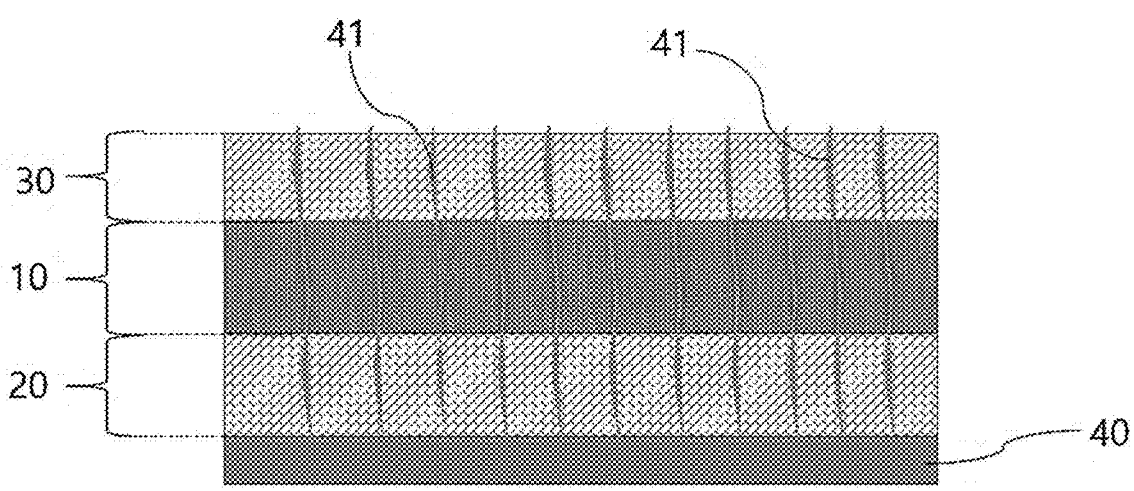
FIG. 1 is a schematic diagram illustrating a cross-section of an electrolyte membrane according to embodiments of the present invention.

The features described above, and other objects, features, and advantages, will be clearly understood from the following preferred embodiments with reference to the annexed drawings. However, the present invention is not limited to the embodiments and will be embodied in different forms. The embodiments are suggested only to offer a thorough and complete understanding of the disclosed contents and to sufficiently inform those skilled in the art of the technical concept of the present invention.

Like reference numbers refer to like elements throughout the description of the figures. In the drawings, the sizes of structures are exaggerated for clarity. It will be understood that, although the terms "first", "second", etc. may be used herein to describe various elements, these elements should not be construed as being limited by these terms, and they are used only to distinguish one element from another. For example, within the scope defined by embodiments of the present invention, a first element may be referred to as a second element, and similarly, a second element may be referred to as a first element. Singular forms are intended to include plural forms as well, unless the context clearly indicates otherwise.

It will be further understood that the terms "comprises", "has", and the like, when used in this specification, specify the presence of stated features, numbers, steps, operations, elements, components, or combinations thereof, but do not preclude the presence or addition of one or more other features, numbers, steps, operations, elements, components, or combinations thereof. In addition, it will be understood that, when an element such as a layer, film, region, or substrate is referred to as being "on" another element, it can be directly on the other element or an intervening element may also be present. It will also be understood that, when an element such as a layer, film, region, or substrate is referred to as being "under" another element, it can be directly under the other element or an intervening element may also be present.

Unless the context clearly indicates otherwise, all numbers, figures and/or expressions that represent ingredients, reaction conditions, polymer compositions, and amounts of mixtures used in the specification are approximations that reflect various uncertainties of measurement occurring inherently in obtaining these figures, among other things. For this reason, it should be understood that, in all cases, the term "about" should be understood to modify all numbers, figures and/or expressions. In addition, when numeric ranges are disclosed in the description, these ranges are continuous and include all numbers from the minimum to the maximum including the minimum and the maximum within the ranges unless otherwise defined. Furthermore, when a range refers to integers, it includes all integers from the minimum to the maximum including the minimum and the maximum within the range, unless otherwise defined.

Embodiments of the present invention relate to a method of manufacturing an electrolyte membrane for fuel cells to improve durability.

FIG. 1 is a schematic diagram illustrating a cross-section of an electrolyte membrane according to embodiments of the present invention.

Referring to FIG. 1, the highly durable electrolyte membrane 100 for fuel cells according to embodiments of the present invention is manufactured using a method of manufacturing an electrolyte membrane to be described later, and micropores 41 are formed in the three-layer structure including a structure of a first ionomer layer 20-*a* porous support 10-*a* second ionomer layer 30. The micropores 41 are impregnated with an additional ionomer solution 40.

Figure 2:
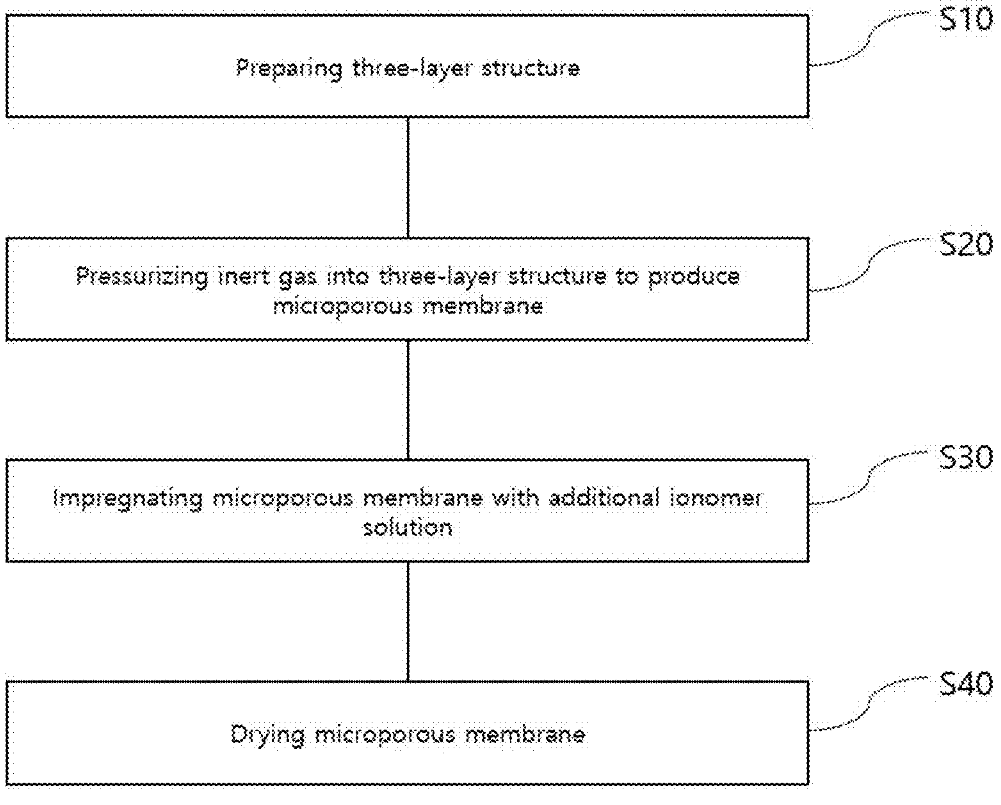
FIG. 2 is a flowchart illustrating a method of manufacturing an electrolyte membrane according to embodiments of the present invention.

Also, embodiments of the present invention relate to a method of manufacturing an electrolyte membrane for fuel cells to improve durability. Hereinafter, embodiments of the present invention will be described in more detail with reference to the accompanying drawings. FIG. 2 is a flowchart illustrating a method of manufacturing an electrolyte membrane according to embodiments of the present invention.

Referring to FIG. 2, the method of manufacturing the electrolyte membrane for fuel cells according to embodiments of the present invention includes preparing a three-layer structure including a first ionomer layer—a porous support—a second ionomer layer structure (S10), pressurizing an inert gas into the three-layer structure to produce a microporous membrane (S20), impregnating the microporous membrane with an additional ionomer solution (S30), and drying the microporous membrane (S40).

Then, each step of the membrane coating method according to embodiments of the present invention will be described in detail as follows.

First, in step S10, the three-layer structure including the structure of the first ionomer layer, the porous support, and the second ionomer layer may be produced.

Step S10 includes preparing a substrate, applying a first ionomer solution to the substrate, impregnating one surface of the porous support with the first ionomer solution, and applying a second ionomer solution to other surface of the porous support to form a three-layer structure having a structure including a first ionomer layer, a porous support, and a second ionomer layer.

First, a substrate is prepared and then a first ionomer solution is applied to the substrate to impregnate one surface of the porous support with the first ionomer solution.

Here, the substrate may be release paper.

The porous support that can be used herein is not particularly limited as long as it can cause capillary action by impregnation channels (pores) and, for example, it may be an expanded polytetrafluoroethylene (e-PTFE) support.

The porosity of the porous support may be 50 to 90%. When the porosity is less than 50%, the ionic conductivity of the electrolyte membrane is disadvantageously low due to the small amount of impregnated ionomer, and when the porosity exceeds 90%, it is disadvantageously difficult to maintain the shape of the porous support due to greatly lowered strength of the porous support.

The first ionomer solution includes at least one selected from the group consisting of sulfonated polyimide (S-PI), sulfonated polyarylethersulfone (S-PAES), sulfonated polyetheretherketone (S-PEEK), perfluorosulfonic acid (PFSA), sulfonated polybenzimidazole (S-PBI), sulfonated polysulfone (S-PSU), sulfonated polystyrene (S-PS), sulfonated polyphosphazene, and combinations thereof.

Subsequently, the second ionomer solution may be applied to the other surface of the porous support, followed by impregnation.

Figure 3:
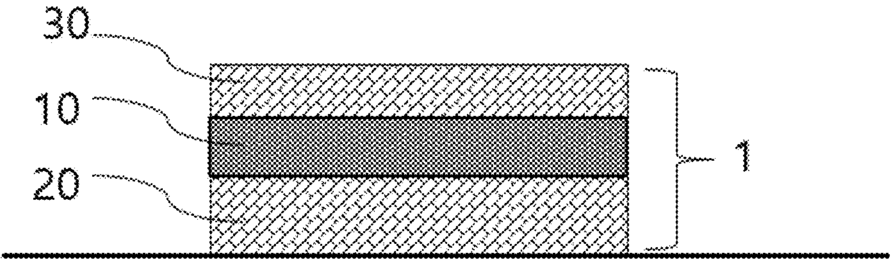
FIG. 3 is a schematic diagram illustrating a cross-section of a three-layer structure.

Accordingly, as shown in FIG. 3, a three-layer structure 1 including a structure of the first ionomer layer 20, the porous support 10, and the second ionomer layer 30 may be formed. Here, FIG. 3 schematically illustrates the cross-section of the three-layer structure.

The second ionomer solution includes at least one selected from the group consisting of sulfonated polyimide (S-PI), sulfonated polyarylethersulfone (S-PAES), sulfonated polyetheretherketone (S-PEEK), perfluorosulfonic acid (PFSA), sulfonated polybenzimidazole (S-PBI), sulfonated polysulfone (S-PSU), sulfonated polystyrene (S-PS), sulfonated polyphosphazene, and combinations thereof.

In step S10, the first ionomer solution and the second ionomer solution may be applied using at least one of gravure coating, slot die coating, and spray coating.

Subsequently, referring to FIGS. 4 and 5, in step S20, the microporous membrane 411 may be formed by pressurizing the inert gas into the three-layer structure 1.

Figure 4:
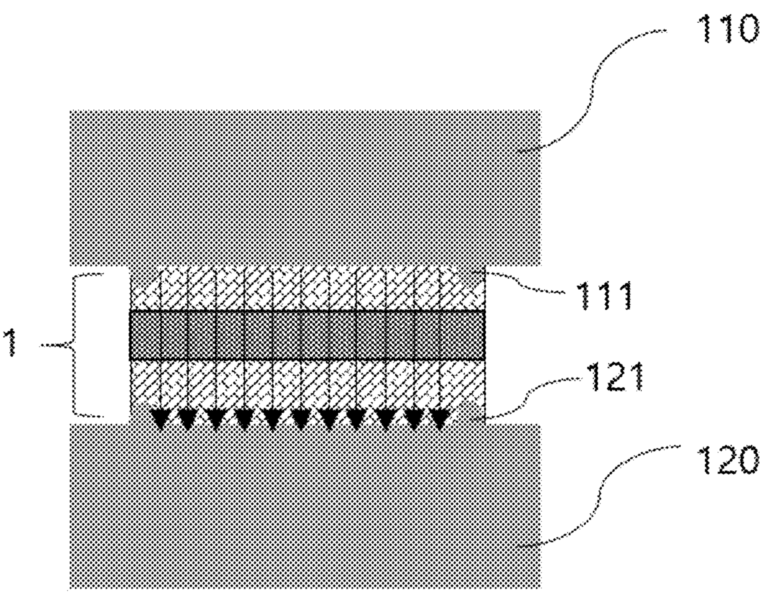
FIG. 4 is a schematic diagram illustrating formation of micropores in the three-layer structure.
Figure 5:
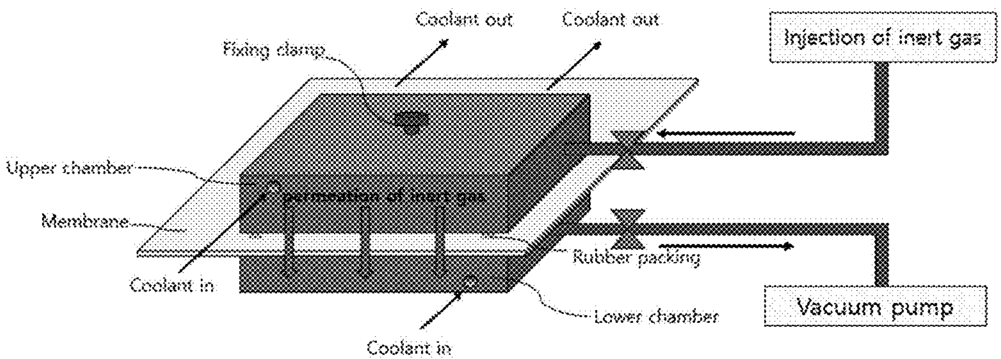
FIG. 5 is a schematic diagram illustrating the cross-section of the microporous membrane.

FIG. 4 is a schematic diagram illustrating formation of micropores in the three-layer structure. FIG. 5 is a schematic diagram illustrating the cross-section of the microporous membrane.

In step S20, the inert gas is pressurized to form micropores 41 in the three-layer structure 1 that has not been subjected to heat treatment, and the inert gas is transmitted at a high pressure in a short distance to form a microporous membrane 411 in which the pores 41 are formed in the electrolyte membrane having the three-layer structure.

The inert gas may include at least one selected from the group consisting of nitrogen, argon, helium, and combinations thereof.

Figure 6:
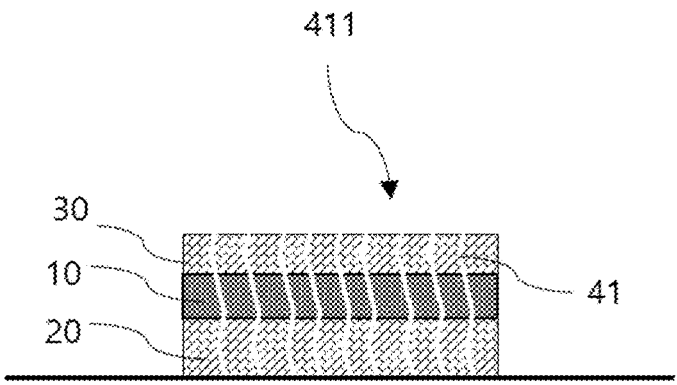
FIG. 6 illustrates a chamber used to form micropores.

FIG. 6 illustrates a chamber used to form micropores.

Referring to FIGS. 4 and 6, in step S20, an inert gas pressurization device is used, and the inert gas pressurization device includes a lower chamber 120 where the three-layer structure is disposed in a horizontal direction and an upper chamber no where the three-layer structure is fixed and the inert gas is pressurized.

The inert gas pressurization device may be made of a material such as stainless steel with good corrosion resistance. The lower chamber 120 is fixed, and the upper chamber no is opened and closed to fix the membrane. The lower chamber 120 and the upper chamber no may be connected to a coolant channel to maintain temperature.

Double rubber packings 111 and 121 may be disposed at the edges of the upper chamber no and the lower chamber 120. The three-layer structure 1 may be tautly fixed by the double rubber packings 111 and 121.

The material for the double rubber packings 111 and 121 may be a rubber having excellent gas permeability (e.g., butyl rubber, nitrile rubber, etc.).

There is a reaction area through which the inert gas permeates inside the double rubber packings 111 and 121.

Therefore, in step S20, the three-layer structure 1 is disposed on the lower chamber 120, and the upper chamber no is covered and fixed with a fixing clamp. Then, the lower chamber 120 is vacuumized to a negative pressure using a vacuum pump, and then an inert gas is injected into the upper chamber no.

In step S20, the inert gas is injected into the three-layer structure 1 in a vertical direction of the three-layer structure 1 using the inert gas pressurization device, and a pressure of 50 to 200 kPa may be applied thereto for 1 to 10 minutes. In this case, step S20 may be performed by operating the inert gas pressurization device at a temperature of 10 to 40° C. Specifically, step S20 may be performed by maintaining a constant temperature of 25° C. in the inert gas pressurization device connected to the coolant channel.

Figure 7:
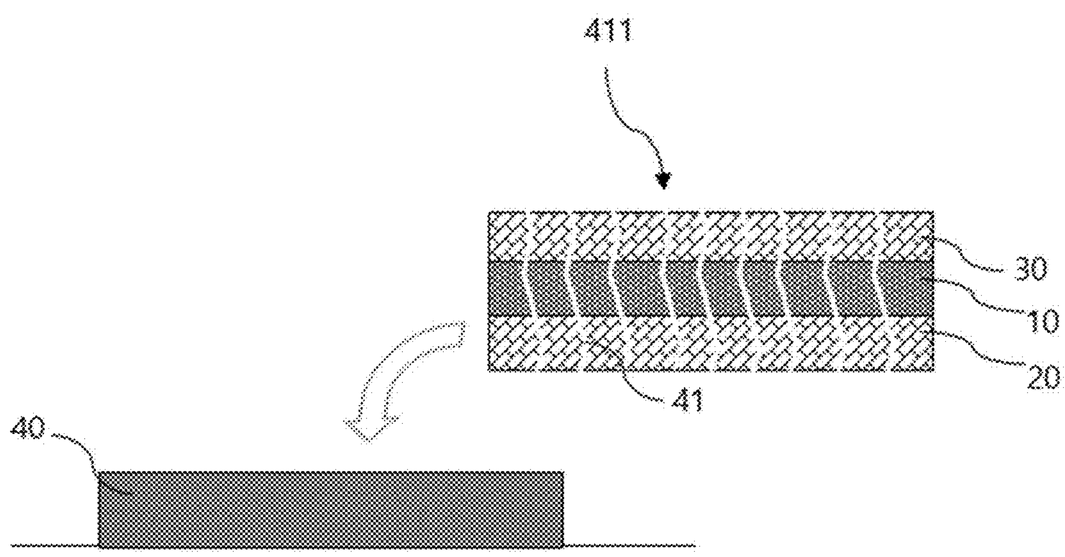
FIG. 7 is a schematic diagram illustrating a state in which the microporous membrane is impregnated with an additional ionomer solution.

Subsequently, referring to FIG. 7, in step S30, the microporous membrane 411 may be impregnated with the additional ionomer solution 40. Here, FIG. 7 is a schematic diagram illustrating the state of impregnating the microporous membrane with the additional ionomer solution.

Accordingly, the additional ionomer solution 40 may be uniformly impregnated through the micropores 41 formed inside the microporous membrane 411 by capillary action.

The additional ionomer solution may have a viscosity of 60 to 80 cP. When the viscosity of the additional ionomer solution is less than 20 cP, it is difficult to control the thickness because the dispersion flows down without being fixed to the release paper when the dispersion is applied and, during membrane production, a large number of cracks may occur due to rapid evaporation of the solvent, which may deteriorate membrane quality.

On the other hand, when the viscosity of the additional ionomer solution exceeds 500 cP, it is impossible to apply the ionomer dispersion due to gelation and it takes a long time to perform impregnation.

The additional ionomer solution may include distilled water, a fluorine-based polymer, ethanol, and normal propanol (n-propanol, nPA).

The fluorine-based polymer may have an equivalent weight (EW) of 800 or more, specifically, it may have an equivalent weight of 800 to 1,500.

Specifically, the fluorine-based polymer may be the short-side-chain (SSC) perfluorinated sulfonic acid ionomer.

The SSC ionomer having an EW of 800 or more exhibits a maximum tensile strength of 0.62 kgf and a tensile strength (@30%) of 0.43 kgf, and thus imparts much better mechanical strength to the electrolyte membrane compared to the LSC ionomer.

In step S30, the microporous membrane may be impregnated with the additional ionomer solution within 1 minute after the formation of the micropores.

In step S30, it is preferable that the time for impregnation be 1 minute or less. When the time for impregnating the microporous membrane with the additional ionomer solution exceeds 1 minute, the viscosity increases due to evaporation of the solvent, resulting in a problem in that the impregnation deteriorates due to gelation.

Figure 8:
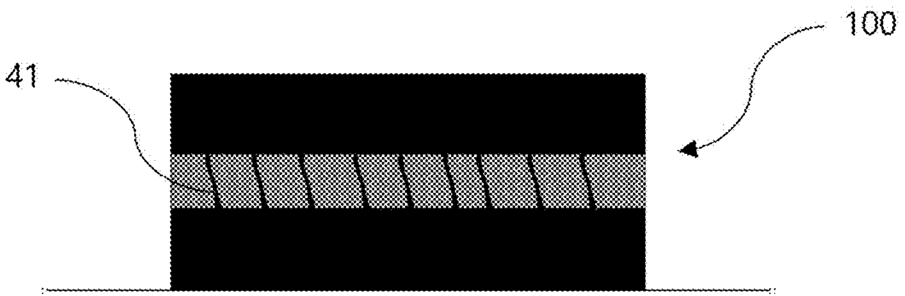
FIG. 8 is a schematic diagram illustrating the cross-section of the electrolyte membrane according to embodiments of the present invention after drying.

Finally, referring to FIG. 8, in step S40, the microporous membrane is dried to finally produce the electrolyte membrane 100 according to embodiments of the present invention.

Here, FIG. 8 schematically shows the cross-section of the electrolyte membrane according to embodiments of the present invention after drying.

Accordingly, the electrolyte membrane 100 according to embodiments of the present invention has a configuration in which the additional ionomer solution remains dried in the micropores 41.

In step S40, appropriate heat treatment may be performed for drying.

Specifically, step S40 may be performed at a temperature of 80 to 180° C. for 5 to 30 minutes.

Therefore, the method of manufacturing the electrolyte membrane according to embodiments of the present invention can secure the ionic conductivity of the electrolyte membrane and increase mechanical stiffness by transmitting an inert gas through the reinforced electrolyte membrane having a three-layer structure at a strong pressure to form micropores in the electrolyte membrane and further coating the electrolyte membrane with an ionomer.

As is apparent from the foregoing, the electrolyte membrane according to embodiments of the present invention can secure the ionic conductivity of the electrolyte membrane and increase mechanical stiffness by transmitting an inert gas through the reinforced electrolyte membrane having a three-layer structure at a strong pressure to form micropores in the electrolyte membrane and further coating the electrolyte membrane with an ionomer.

The effects of embodiments of the present invention are not limited to those mentioned above. It should be understood that the effects of embodiments of the present invention include all effects that can be inferred from the foregoing description of embodiments of the present invention.

Embodiments of the invention have been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing an electrolyte membrane for fuel cells, the method comprising:

preparing a three-layer structure comprising a porous support, a first ionomer layer on a first surface of the porous support and a second ionomer layer on a second surface of the porous support opposite the first surface;

pressurizing an inert gas into the three-layer structure to produce a microporous membrane;

impregnating the microporous membrane with an additional ionomer solution; and drying the microporous membrane.

2. The method according to claim 1, wherein preparing the three-layer structure comprises:

preparing a substrate;

applying a first ionomer solution to the substrate;

impregnating a first surface of the porous support with the first ionomer solution; and applying a second ionomer solution to a second surface of the porous support to form the three-layer structure comprising the first ionomer layer, the porous support, and the second ionomer layer.

3. The method according to claim 2, wherein the first ionomer solution comprises at least one solution selected from the group consisting of sulfonated polyimide (S-PI), sulfonated polyarylethersulfone (S-PAES), sulfonated polyetheretherketone (S-PEEK), perfluorosulfonic acid (PFSA), sulfonated polybenzimidazole (S-PBI), sulfonated polysulfone (S-PSU), sulfonated polystyrene (S-PS), sulfonated polyphosphazene, and combinations thereof.

4. The method according to claim 2, wherein the second ionomer solution comprises at least one solution selected from the group consisting of sulfonated polyimide (S-PI), sulfonated polyarylethersulfone (S-PAES), sulfonated polyetheretherketone (S-PEEK), perfluorosulfonic acid (PFSA), sulfonated polybenzimidazole (S-PBI), sulfonated polysulfone (S-PSU), sulfonated polystyrene (S-PS), sulfonated polyphosphazene, and combinations thereof.

5. The method according to claim 2, wherein the porous support comprises an expanded polytetrafluoroethylene (e-PTFE) support.

6. The method according to claim 1, wherein producing the microporous membrane comprises applying a pressure of 50 to 200 kPa to the three-layer structure in a vertical direction of the three-layer structure for 1 to 10 minutes.

7. The method according to claim 1, wherein producing the microporous membrane is performed at a temperature of 10 to 40° C.

8. The method according to claim 1, wherein producing the microporous membrane comprises using an inert gas pressurization device.

9. The method according to claim 8, wherein the inert gas pressurization device comprises:

a lower chamber disposing the three-layer structure in a horizontal direction; and an upper chamber fixing the three-layer structure and pressurizing the inert gas.

10. The method according to claim 1, wherein the inert gas comprises at least one selected from the group consisting of nitrogen, argon, helium, and combinations thereof.

11. The method according to claim 1, wherein impregnating the microporous membrane is performed by impregnating the microporous membrane with the additional ionomer solution within 1 minute after producing the microporous membrane.

12. The method according to claim 1, wherein the additional ionomer solution comprises distilled water, a fluorine-based polymer, ethanol, and normal propanol (n-propanol, nPA).

13. The method according to claim 12, wherein the fluorine-based polymer has an equivalent weight (EW) of 800 or more.

14. The method according to claim 1, wherein the additional ionomer solution has a viscosity of 60 to 80 cP.

15. The method according to claim 1, wherein drying the microporous membrane is performed at a temperature of 80 to 180° C. for 5 to 30 minutes.

16. A method of manufacturing an electrolyte membrane for fuel cells, the method comprising:

preparing a three-layer structure comprising a porous support, a first ionomer layer on a first surface of the porous support, and a second ionomer layer on a second surface of the porous support opposite the first surface;

producing a microporous membrane by pressurizing an inert gas into the three-layer structure, wherein producing the microporous membrane comprises applying a pressure of 50 to 200 kPa to the three-layer structure in a vertical direction of the three-layer structure for 1 to 10 minutes at a temperature of 10 to 40° C.;

impregnating the microporous membrane with an additional ionomer solution; and drying the microporous membrane at a temperature of 80 to 180° C. for 5 to 30 minutes.

* * * * *